(12) United States Patent
Tachibana et al.

(10) Patent No.: US 12,002,126 B2
(45) Date of Patent: *Jun. 4, 2024

(54) VEHICLE INFORMATION PROCESSING APPARATUS, VEHICLE INFORMATION PROCESSING SYSTEM, AND METHOD OF PROCESSING VEHICLE INFORMATION

(71) Applicant: TOYOTA JIDOSHA KABUSHIKI KAISHA, Toyota (JP)

(72) Inventors: Akihide Tachibana, Susono (JP); Katsuhiro Sakai, Hadano (JP); Makoto Kawaharada, Shizuoka-ken (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,388

(22) Filed: Dec. 8, 2022

(65) Prior Publication Data
US 2023/0103492 A1 Apr. 6, 2023

Related U.S. Application Data

(63) Continuation of application No. 16/710,443, filed on Dec. 11, 2019, now Pat. No. 11,615,500.

(30) Foreign Application Priority Data

Jan. 16, 2019 (JP) .................................. 2019-005001

(51) Int. Cl.
*G06Q 50/40* (2024.01)
*G05D 1/00* (2024.01)

(52) U.S. Cl.
CPC .......... *G06Q 50/40* (2024.01); *G05D 1/0088* (2013.01)

(58) Field of Classification Search
CPC ................ G06Q 50/30; G05D 1/0088; G05D 2201/0213; G08G 1/205; G08G 1/127;
(Continued)

(56) References Cited

U.S. PATENT DOCUMENTS

2002/0099500 A1* 7/2002 Schmier ................ G08G 1/123
701/532
2017/0075358 A1* 3/2017 Zhang ................ G06Q 10/1093
(Continued)

FOREIGN PATENT DOCUMENTS

CN 107437233 A 12/2017
CN 105094767 B 2/2019
(Continued)

OTHER PUBLICATIONS

Notice of Allowance issued on Jan. 10, 2023 to U.S. Appl. No. 16/710,443, filed Dec. 11, 2019.

*Primary Examiner* — Rami Khatib
(74) *Attorney, Agent, or Firm* — Dinsmore & Shohl LLP

(57) ABSTRACT

A vehicle information processing apparatus includes a communication unit configured to communicate with a terminal of a first user, a storage unit configured to store an end-of-use position and an expected end-of-use time at which a second user of a vehicle ends use of the vehicle for each of a plurality of vehicles subjected to autonomous driving control and occupied by the second user, and a vehicle selection unit configured to acquire a boarding position and a boarding time at which the first user wants to get on a vehicle from the terminal via the communication unit and select at least one vehicle, of which the end-of-use position and the expected end-of-use time are in a predetermined relationship with the boarding position and the boarding time, from among the plurality of vehicles while referring to the storage unit.

20 Claims, 15 Drawing Sheets

(58) Field of Classification Search
CPC ...... G08G 1/123; H04W 4/025; H04W 4/029; H04W 4/44
See application file for complete search history.

(56) References Cited

U.S. PATENT DOCUMENTS

| | | |
|---|---|---|
| 2017/0314948 A1 | 11/2017 | Racah et al. |
| 2017/0344911 A1 | 11/2017 | Shimura |
| 2018/0211186 A1 | 7/2018 | Rakah |
| 2018/0283883 A1* | 10/2018 | Iland ................ G06Q 10/06311 |
| 2019/0130745 A1* | 5/2019 | Turato ................... G08G 1/205 |
| 2019/0354112 A1* | 11/2019 | Zhang .................... G08G 1/127 |
| 2021/0366286 A1* | 11/2021 | Kajiwara ................ G08G 1/133 |

FOREIGN PATENT DOCUMENTS

| | | |
|---|---|---|
| CN | 107403560 B | 11/2019 |
| CN | 107464413 B | 1/2021 |
| JP | 2012215920 A | 11/2012 |
| JP | 2016057946 A | 4/2016 |

* cited by examiner

FIG. 3

| VEHICLE IDENTIFICATION NUMBER | OCCUPANCY INFORMATION | END-OF-USE POSITION | EXPECTED END-OF-USE TIME | CURRENT POSITION | VEHICLE TYPE | LOAD CAPACITY | SMOKING INFORMATION | WHEELCHAIR INFORMATION | UTILIZATION FORM | NUMBER-OF-OCCUPANT | DRIVE TYPE |
|---|---|---|---|---|---|---|---|---|---|---|---|
| | | | | | | | | | | | |
| | | | | | | | | | | | |
| | | | | | | | | | | | |
| | | | | | | | | | | | |

A1 – A2 – A3 – A4 – A5 – A6 – A7 – A8 – A9 – A10 – A11 – A12

12c

US 12,002,126 B2

VEHICLE INFORMATION PROCESSING APPARATUS, VEHICLE INFORMATION PROCESSING SYSTEM, AND METHOD OF PROCESSING VEHICLE INFORMATION

CROSS-REFERENCE TO RELATED APPLICATIONS

This application is a continuation application of U.S. patent application Ser. No. 16/710,443 filed on Dec. 11, 2019, which claims priority to Japanese Patent Application No. 2019-005001 filed on Jan. 16, 2019, the entire contents of both applications are hereby incorporated herein by reference.

BACKGROUND

1. Technical Field

The disclosure relates to a vehicle information processing apparatus, a vehicle information processing system, and a method of processing vehicle information.

2. Description of Related Art

In recent years, an autonomous vehicle which is driven by autonomous driving control has been developed. In the case of a vehicle subject to autonomous driving control, driving operations such as driving, steering, and braking which are performed by a person in the related art are performed by the vehicle.

For example, providing a mobility service such as a taxi service by using an autonomous vehicle has been proposed (US 2017-0314948 A).

A user who requests provision of a mobility service transmits a boarding position and a destination to a server. The server selects one vehicle available for the user and notifies the user. The user gets on the vehicle selected by the server to move to the destination.

SUMMARY

For a manager of a system that provides a mobility service, a vehicle should be used by a user efficiently. For example, a vehicle should be used by the next user immediately after current use of the vehicle is finished in the viewpoint of improving the occupancy rate of the vehicle.

The disclosure provides a vehicle information processing apparatus that notifies a user of an available vehicle based on a boarding position and a boarding time at which the user wants to get on a vehicle subject to autonomous driving control.

A first aspect of the disclosure relates to a vehicle information processing apparatus including a communication unit, a storage unit, a vehicle selection unit, and a vehicle information notification unit. The communication unit is configured to be connected to a terminal of a first user such that the communication unit communicates with the terminal. The storage unit is configured to store an end-of-use position and an expected end-of-use time at which a second user of a vehicle ends use of the vehicle for each of a plurality of vehicles subjected to autonomous driving control and occupied by the second user. The vehicle selection unit is configured to acquire a boarding position and a boarding time at which the first user wants to get on a vehicle from the terminal via the communication unit and select at least one vehicle, of which the end-of-use position and the expected end-of-use time are in a predetermined relationship with the boarding position and the boarding time, from among the plurality of vehicles while referring to the storage unit. The vehicle information notification unit is configured to notify the terminal of the end-of-use position and the expected end-of-use time of each of the at least one vehicle selected by the vehicle selection unit via the communication unit.

In the vehicle information processing apparatus, the storage unit may store vehicle-related information including information about a vehicle other than the end-of-use position and the expected end-of-use time of the vehicle for each of the plurality of vehicles and the vehicle information notification unit may notify the terminal of the end-of-use position, the expected end-of-use time, and the vehicle-related information of each of the at least one selected vehicle via the communication unit.

Particularly, in the vehicle information processing apparatus, the vehicle selection unit may decide the priority level of each of the at least one selected vehicle based on the end-of-use position, the expected end-of-use time, and the vehicle-related information and the vehicle information notification unit may notify the terminal of the priority level along with the end-of-use position and the expected end-of-use time of each of the at least one selected vehicle via the communication unit.

In addition, in the vehicle information processing apparatus, the vehicle selection unit may acquire information indicating the current position of the first user and a user-selected vehicle selected by the first user from among the plurality of vehicles via the communication unit, the vehicle selection unit may obtain a standby time for which the first user having arrived at an end-of-use position stands by until the user-selected vehicle arrives at the end-of-use position based on the current position of the first user, the moving speed of the first user, and the end-of-use position and the expected end-of-use time of the user-selected vehicle, and the vehicle information notification unit may notify the terminal of the standby time via the communication unit.

In addition, in the vehicle information processing apparatus, the vehicle selection unit may acquire information indicating the current position of the first user and a user-selected vehicle selected by the first user from among the plurality of vehicles via the communication unit; the vehicle selection unit selects at least one vehicle other than the user-selected vehicle, of which the end-of-use position and the expected end-of-use time are in the predetermined relationship with the boarding position and the boarding time, from among the plurality of vehicles while referring to the storage unit in a case where a time at which the user-selected vehicle arrives at an end-of-use position is later than an expected end-of-use time, and the vehicle information notification unit may notify the terminal of the end-of-use position and the expected end-of-use time of each of the at least one selected other vehicle via the communication unit.

In addition, in the vehicle information processing apparatus, the vehicle selection unit may select the at least one vehicle, of which the end-of-use position is separated from the boarding position by a predetermined distance and the expected end-of-use time is within a predetermined time from the boarding time, from among the plurality of vehicles.

A second aspect of the disclosure relates to an information processing apparatus including a communication unit, a storage unit, a vehicle information acquisition unit, and a vehicle information notification unit. The communication unit is configured to be connected to a terminal of a first user such that the communication unit communicates with the terminal. The storage unit is configured to store an end-of-use position and an expected end-of-use time at which a second user of a vehicle ends use of the vehicle for each of a plurality of vehicles subjected to autonomous driving control and occupied by the second user. The vehicle information acquisition unit is configured to acquire a boarding position at which the first user wants to get on a vehicle from the terminal via the communication unit and obtain an expected arrival time at which the vehicle arrives at the boarding position for each of the vehicles based on the end-of-use positions and the expected end-of-use times while referring to the storage unit. The vehicle information notification unit is configured to notify the terminal of the expected arrival times of the vehicles obtained by the vehicle information acquisition unit via the communication unit.

Particularly, in the vehicle information processing apparatus, the vehicle information acquisition unit may acquire a boarding time at which the first user wants to get on a vehicle from the terminal via the communication unit and the vehicle information notification unit may notify the terminal of the expected arrival times of the vehicles selected by the vehicle information acquisition unit along with an order in which the expected arrival times are close to the boarding time.

A third aspect of the disclosure relates to a vehicle information processing system including a terminal to which information is input by a first user and a vehicle information processing apparatus. The vehicle information processing apparatus includes a communication unit, a storage unit, a vehicle selection unit, and a vehicle information notification unit. The communication unit is configured to be connected to the terminal such that the communication unit communicates with the terminal. The storage unit is configured to store an end-of-use position and an expected end-of-use time at which a second user of a vehicle ends use of the vehicle for each of a plurality of vehicles subjected to autonomous driving control and occupied by the second user. The vehicle selection unit is configured to acquire a boarding position and a boarding time at which the first user wants to get on a vehicle from the terminal via the communication unit and select at least one vehicle, of which the end-of-use position and the expected end-of-use time are in a predetermined relationship with the boarding position and the boarding time, from among the plurality of vehicles while referring to the storage unit. The vehicle information notification unit is configured to notify the terminal of the end-of-use position and the expected end-of-use time of each of the at least one vehicle selected by the vehicle selection unit via the communication unit.

A fourth aspect of the disclosure relates to a terminal which processes vehicle information. The terminal includes an input unit, a communication unit, a display unit, and a processor. The input unit is a unit to which information is input by a first user. The communication unit is configured to transmit the information input from the input unit. The display unit is configured to display information received by the communication unit. The processor receives an input of a boarding position and a boarding time, at which a first user wants to get on a vehicle subjected to autonomous driving control, from the first user using the input unit. The processor transmits the boarding position and the boarding time to a server via the communication unit. The processor receives, via the communication unit, the end-of-use position and the expected end-of-use time of at least one vehicle, of which the end-of-use position and the expected end-of-use time are in a predetermined relationship with the boarding position and the boarding time and that the server selects from among a plurality of vehicles occupied by a second user while referring to a storage unit storing an end-of-use position and an expected end-of-use time at which the second user of a vehicle ends use of the vehicle for each of the plurality of vehicles. The processor causes the display unit to display the end-of-use position and the expected end-of-use time of each of the at least one vehicle.

A fifth aspect of the disclosure relates to a method of processing vehicle information. The method includes acquiring a boarding position and a boarding time at which a first user wants to get on a vehicle subjected to autonomous driving control from a terminal via a communication unit by a processor, selecting at least one vehicle, of which the end-of-use position and the expected end-of-use time are in a predetermined relationship with the boarding position and the boarding time, from among a plurality of vehicles occupied by a second user while referring to a storage unit storing an end-of-use position and an expected end-of-use time at which the second user of a vehicle ends use of the vehicle for each of the plurality of vehicles by the processor, and notifying the terminal of the end-of-use position and the expected end-of-use time of each of the at least one vehicle selected by the vehicle selection unit via the communication unit by the processor.

With the vehicle information processing apparatus according to the aspects of the disclosure, it is possible to notify a user of an available vehicle based on a boarding position and a boarding time at which the user wants to get on a vehicle subject to autonomous driving control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram for describing a vehicle management table;

DETAILED DESCRIPTION OF EMBODIMENTS

Hereinafter, an embodiment of a vehicle information processing system disclosed in the present specification will be described with reference to drawings. The technical scope of the disclosure is not limited to the embodiment and includes the disclosure described in the claims and equivalents thereof.

Figure 1:
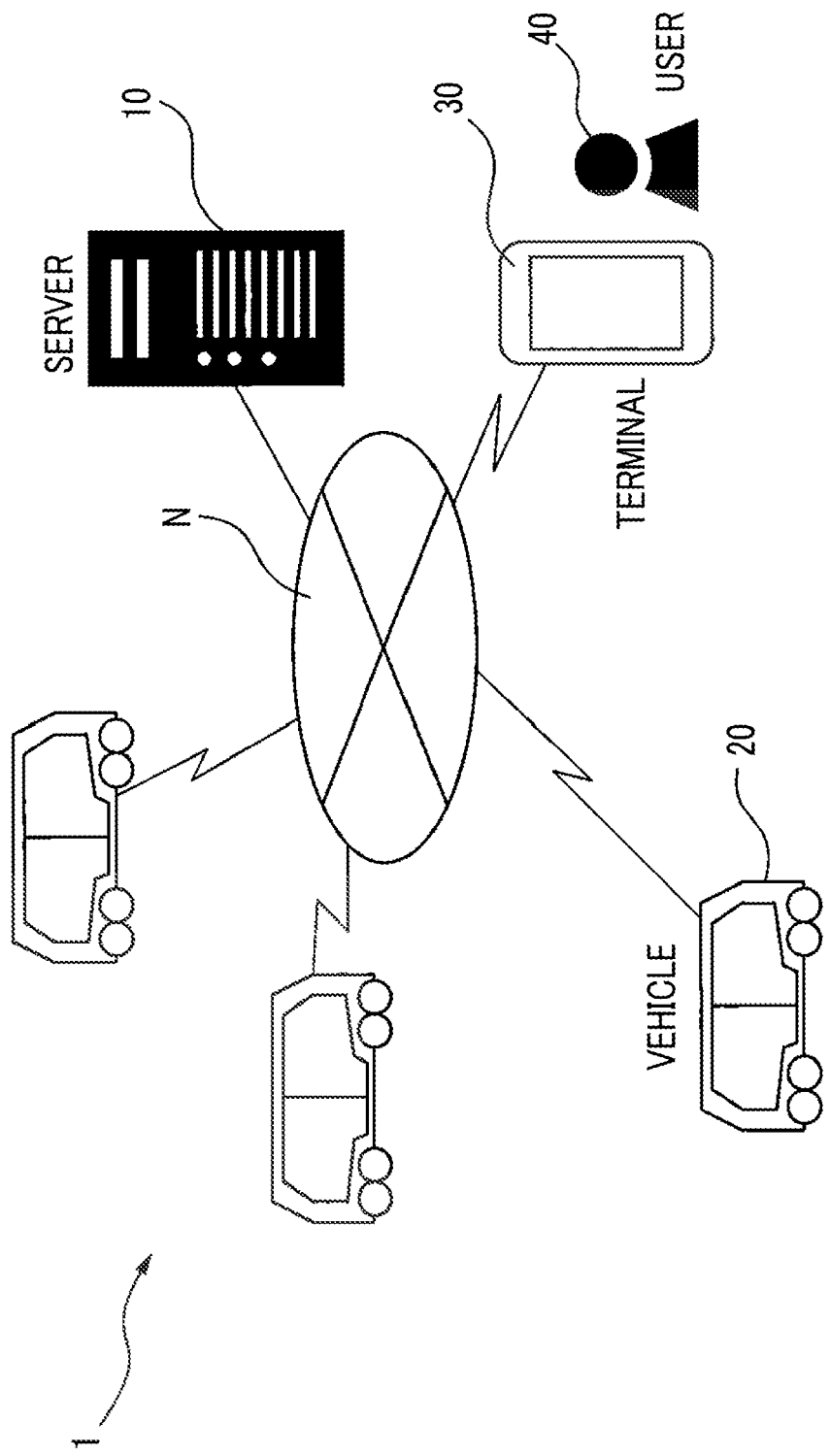
FIG. 1 is a diagram illustrating a configuration according to an embodiment of a vehicle information processing system in the disclosure.

FIG. 1 is a diagram illustrating a configuration according to an embodiment of a vehicle information processing system in the disclosure.

A vehicle information processing system 1 (hereinafter, simply referred to as "system 1") in the present embodiment is provided with a server 10, a plurality of vehicles 20 subjected to autonomous driving control, and a terminal 30 operated by a user 40. The server 10 is connected to the vehicles 20 and the terminal 30 via a wireless base station (not shown) such that communication therebetween can be performed via a network N.

The vehicles 20 may be autonomous vehicles that provide a service as a mobility (mobility service) such as a taxi service and a ridesharing service.

The vehicles 20 transmit current position information and vehicle information such as a traveling speed and the number of occupants to the server 10 via the network N at predetermined time intervals or at any time.

In addition, the terminal 30 also transmits current position information to the server 10 via the network N at predetermined time intervals or at any time.

In the case of the system 1 disclosed in the present specification that processes vehicle information, the user 40 who requests provision of a mobility service transmits a boarding position and a boarding time, at which the user 40 wants to get on the vehicle 20 subjected to autonomous driving control, to the server 10 by using the terminal 30. The server 10 selects one or more vehicles 20 based on end-of-use positions and expected end-of-use times, at which other users (not shown) using the vehicles 20 ends use of the vehicles 20, and notifies the user 40 of a list of the selected vehicles 20. The server 10 selects the vehicle 20 of which the end-of-use position and the expected end-of-use time are in a predetermined relationship with the boarding position and the boarding time at which the user wants to get on a vehicle.

The user 40 selects one vehicle that the user wants to get on from the list of vehicles 20 by the terminal 30 and transmits information indicating the selected vehicle to the server 10. The server 10 transmits a standby request to the selected vehicle 20 to request the selected vehicle 20 to standby at the end-of-use position until the user 40 gets on the vehicle 20. The user 40 gets on the vehicle 20 at the end-of-use position to move to a destination.

Note that, in FIG. 1, one user 40 and one terminal 30 are shown. However, there may be a plurality of users using the system 1. In this case, in communication between the terminals 30 and the server 10, each terminal may be identified by terminal identification information for terminal identification. In addition, each user may be identified by user identification information for user identification.

Hereinafter, the system 1 will be described in more detail.

Figure 2:
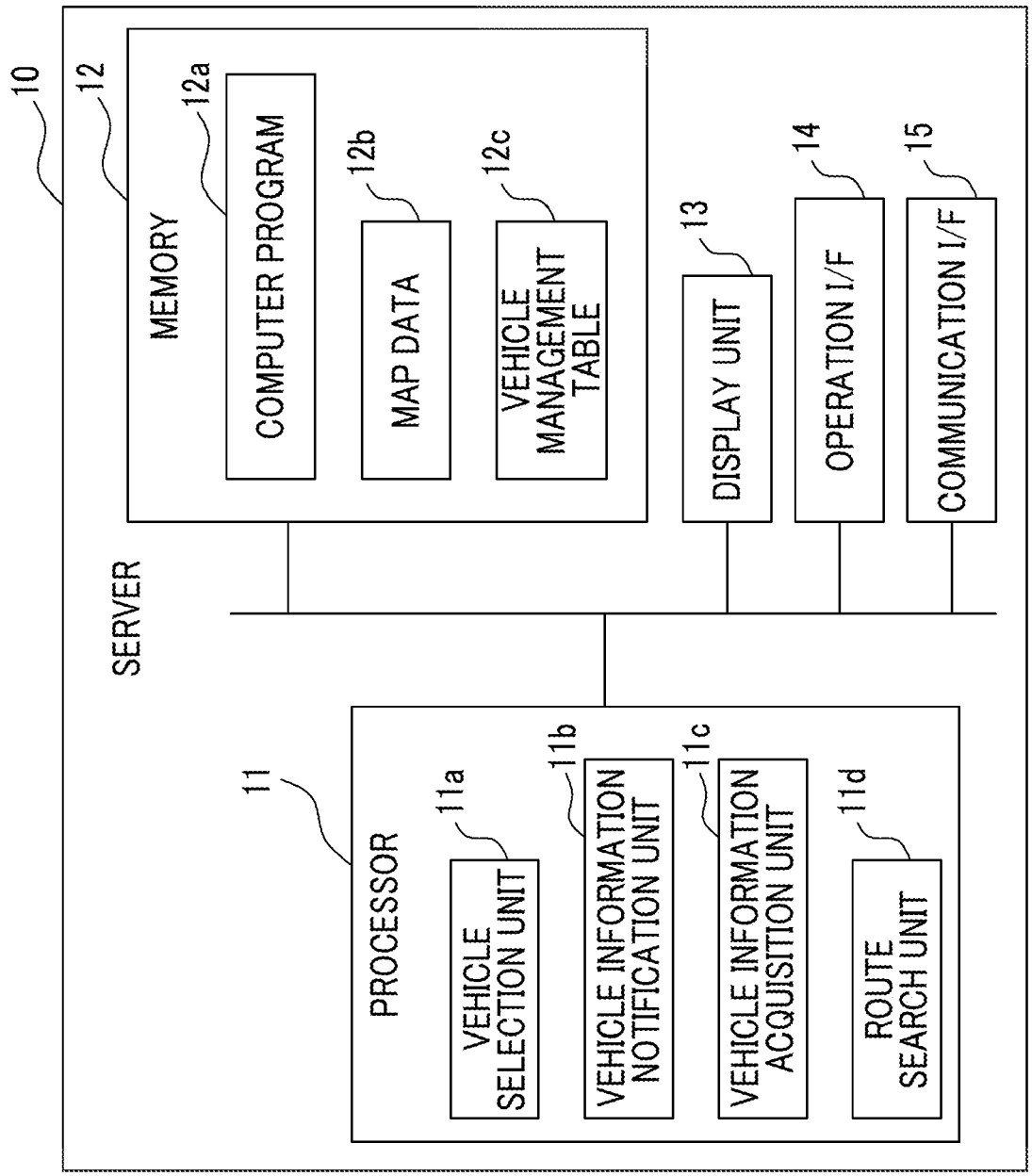
FIG. 2 is a hardware configuration diagram of a server.

FIG. 2 is a hardware configuration diagram of the server 10.

The server 10 includes a processor 11, a memory 12, a display unit 13, an operation interface (I/F) 14, and a communication interface (I/F) 15.

The processor 11 includes one or more calculation circuits executing a computer program for control and calculation in the server 10 and a circuit in the vicinity of the one or more calculation circuits. The processor 11 includes a vehicle selection unit 11a, a vehicle information notification unit 11b, a vehicle information acquisition unit 11c, and a route search unit 11d. The vehicle selection unit 11a, the vehicle information notification unit 11b, the vehicle information acquisition unit 11c, and the route search unit 11d are realized as a software module or firmware executed on the processor 11, for example. Processes performed by the vehicle selection unit 11a, the vehicle information notification unit 11b, the vehicle information acquisition unit 11c, and the route search unit 11d will be described later. Note that, each of these units of the processor 11 may be mounted in the server 10 as an individual circuit.

The memory 12 includes a storage medium such as a hard disk drive (HDD), an optical storage medium, and a semiconductor storage device and stores a computer program 12a executed in the processor 11. In addition, the memory 12 stores data that is generated by the processor 11, data that is received by the processor 11 via the network N, or the like. In addition, the memory 12 stores map data 12b and a vehicle management table 12c. The map data 12b includes map information. In the vehicle management table 12c, information about the vehicle 20 registered in the system 1 is registered.

FIG. 3 is a diagram for describing the vehicle management table 12c.

The vehicle management table 12c includes vehicle identification number fields A1, occupancy information fields A2, end-of-use position fields A3, expected end-of-use time fields A4, current position fields A5, vehicle type fields A6, load capacity fields A7, smoking information fields A8, wheelchair information fields A9, utilization form fields A10, number-of-occupants fields A11, and drive type fields A12.

In the vehicle identification number field A1, numbers for identification of the vehicles 20 are registered. In the occupancy information field A2, whether the vehicle 20 is being used by a user or not is registered. In the occupancy information field A2, for example, "occupied" is registered in a case where the vehicle is being used and "empty" is registered in a case where the vehicle is not being used. In the end-of-use position field A3, a position at which use of the vehicle ends (destination of user) is registered in a case where the vehicle 20 is being used. An end-of-use position is designated by a combination of a facility name, an address, a longitude, and a latitude, for example. In the expected end-of-use time field A4, an expected time of the end of use of the vehicle 20 used by a user (expected time of arrival at destination) is registered in a case where the vehicle 20 is being used. In the current position field A5, the current position of the vehicle 20 is registered. In the vehicle type field A6, information for identification of a vehicle such as the name or the like of the vehicle is registered. In the load capacity field A7, the maximum quantity of a package that a user can load into the vehicle 20 is registered. The maximum quantity of a package that can be loaded may be represented by a volume or a weight. In the smoking information field A8, whether smoking in the vehicle 20 is allowed or not is registered. In the wheelchair information field A9, whether a user using a wheelchair can get on the vehicle 20 in a state of being on the wheelchair or not is registered. In the utilization form field A10, whether the utilization form of the vehicle 20 is a charter type in which a user solely gets on the vehicle (non-pool type) or a sharing type in which a user gets on the vehicle together with another user (pool type) is registered. In the number-of-occupants field A11, the number of occupants currently present in the vehicle is registered in a case where the utilization form is the sharing type. Note that, in a case where the utilization form is the charter type, the number of occupants is zero at a time when a new user gets on the vehicle 20. In the drive type field A12, the type of a drive device for the vehicle 20 is registered. Examples of the type of the drive device include a hybrid type that includes an internal combustion engine and an electric motor, an electric type that includes an electric motor, and an engine type that includes an internal combustion engine.

A vehicle type, a load capacity, smoking information, wheelchair information, a utilization form, and a drive type as described above are information about a vehicle which is not changed and are registered in the vehicle management table 12c while being correlated with vehicle identification information.

Meanwhile, occupancy information, an end-of-use position, an expected end-of-use time, the current position, and the number of occupants are information that is changed when the vehicle 20 is operated. The information items as above are updated by the vehicle information acquisition unit 11c of the processor 11 in the server 10 at predetermined time intervals or at any time based on information that is transmitted from the vehicle 20 via the network N.

Since the user 40 receives end-of-use positions and expected end-of-use times together with the other vehicle-related information items as described above as information about the vehicles 20 that are available, the user 40 can select a vehicle to use based on items other than the end-of-use positions and the expected end-of-use times. For example, the user 40 who uses a wheelchair can select the vehicle 20 that the user can get on in a state of being on the wheelchair. In addition, the user 40 who do not smoke can select the vehicle 20 in which smoking is not allowed. In addition, the user 40 with a large package can select the vehicle 20 of which the load capacity is large.

Note that, vehicle-related information registered in the vehicle management table 12c is merely an example. A larger number of information items may be registered in the vehicle management table 12c and a smaller number of information items may be registered in the vehicle management table 12c.

The display unit 13 is controlled by the processor 11 and can display various kinds of information relating to the operation of the server 10. As the display unit 13, for example, a liquid crystal display can be used.

The operation I/F 14 is operated by a manager of the server 10 and an operation can be input thereto. As the operation I/F 14, for example, a keyboard or a mouse can be used.

The communication I/F 15 includes a communication I/F circuit for connecting the server 10 to the network N via a gateway or the like. The communication I/F 15 is configured to be able to communicate with the vehicles 20 and the terminal 30 via the network N.

Figure 4:
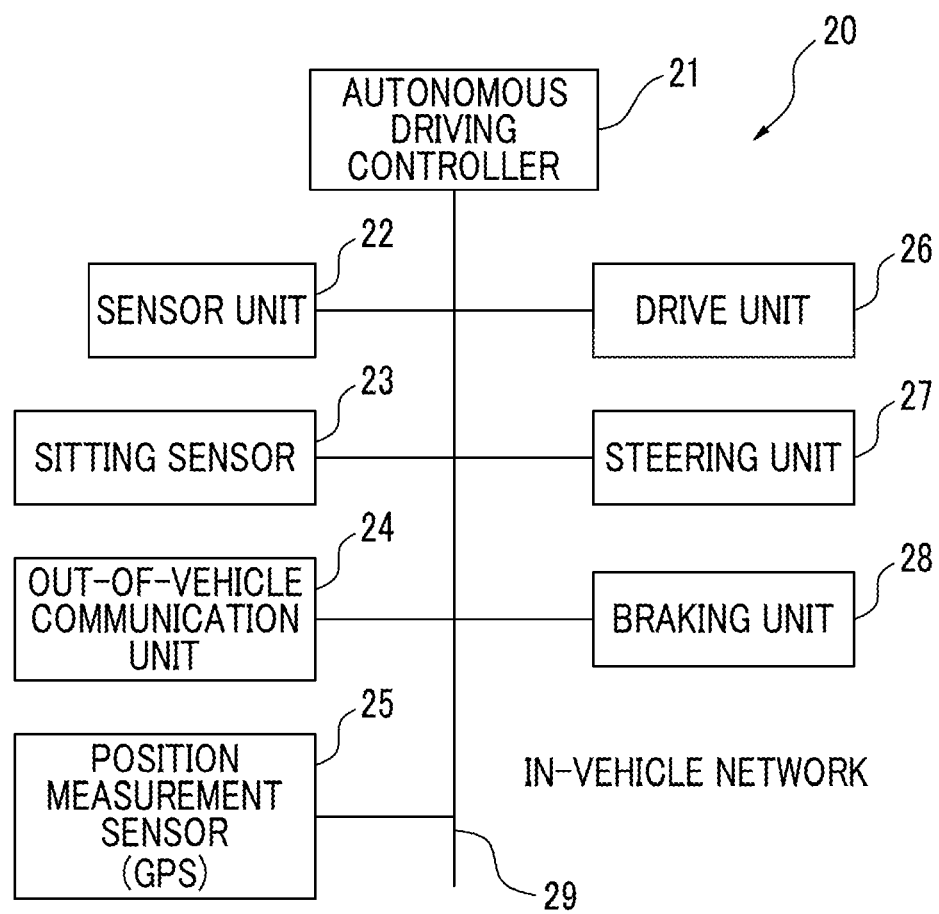
FIG. 4 is a hardware configuration diagram of a vehicle.

FIG. 4 is a hardware configuration diagram of the vehicle 20.

The vehicle 20 includes an autonomous driving controller 21, a sensor unit 22, a sitting sensor 23, an out-of-vehicle communication unit 24, a position measurement sensor 25, a drive unit 26, a steering unit 27, and a braking unit 28, which are connected to each other via an in-vehicle network 29. As the in-vehicle network 29, for example, a network conforming to a controller area network (CAN) standard can be used.

The autonomous driving controller 21 controls the operation of the vehicle by outputting a control signal to the drive unit 26, the steering unit 27, and the braking unit 28, the control signal being generated such that the vehicle moves to a destination along a route based on vehicle environment information input from the sensor unit 22 and the position measurement sensor 25. The autonomous driving controller 21 receives information indicating a route generated by the server 10 and controls the driving of the vehicle 20 based on the received route. In addition, the route of the vehicle 20 may be generated by a navigation unit (not shown) of the vehicle 20 based on a current location and a destination input by an occupant.

The sensor unit 22 transmits acquired vehicle environment information to the autonomous driving controller 21 via the in-vehicle network 29. The sensor unit 22 includes, for example, an out-of-vehicle camera, an in-vehicle camera, a distance measurement sensor, and a vehicle speed sensor. The out-of-vehicle camera images the vicinity of the vehicle 20 and outputs an image of the vicinity of the vehicle 20. The in-vehicle camera images the inside of the vehicle 20 and outputs an image of the inside of the vehicle 20. The distance measurement sensor measures a distance to an object present in front of the vehicle 20 and outputs the distance for each cardinal direction. As the distance measurement sensor, for example, a light detection and ranging (LIDAR) sensor can be used. The vehicle speed sensor detects information about the traveling speed of the vehicle 20. As the vehicle speed sensor, for example, an axle rotation rate sensor can be used.

The sitting sensor 23 outputs a sitting signal, which indicates whether each sitting position in the vehicle 20 is in a seated state or not, to the autonomous driving controller 21. For example, the sitting sensor 23 may be a pressure sensor that outputs the sitting signal when detecting that the sitting pressure on a sitting position in the vehicle 20 that is applied by the user 40 sitting on the sitting position exceeds a predetermined threshold value.

The out-of-vehicle communication unit 24 is a vehicle-mounted communication device that has a wireless communication function. The out-of-vehicle communication unit 24 accesses a wireless base station (not shown) that is connected to the network N via a gateway (not shown) such that the out-of-vehicle communication unit 24 is connected to the network N via the wireless base station. The out-of-vehicle communication unit 24 is configured to be able to communicate with the server 10 and the terminal 30 via the network N.

The position measurement sensor 25 generates position information indicating the current location of the vehicle 20 and outputs the position information to the autonomous driving controller 21. The position information generated by the position measurement sensor 25 is used for the autonomous driving controller 21 to automatically control the driving of the vehicle 20 and is periodically transmitted to the server 10 via the network N such that the server 10 can grasp the current position of the vehicle 20. The position measurement sensor 25 is, for example, a global positioning system (GPS) receiver installed in the vehicle 20.

The drive unit 26 generates a drive force for the vehicle 20 based on the control signal to accelerate the vehicle. The drive unit 26 includes, for example, both or one of an engine which is an internal combustion engine and an electric motor.

The steering unit 27 decides a proceeding direction of the vehicle based on the control signal. The steering unit 27 includes a steering mechanism that controls the orientations of wheels of the vehicle 20.

The braking unit 28 generates a braking force for the vehicle 20 based on the control signal. The braking unit 28 includes, for example, a brake disk, a brake caliper, and a hydraulic mechanism.

Figure 5:
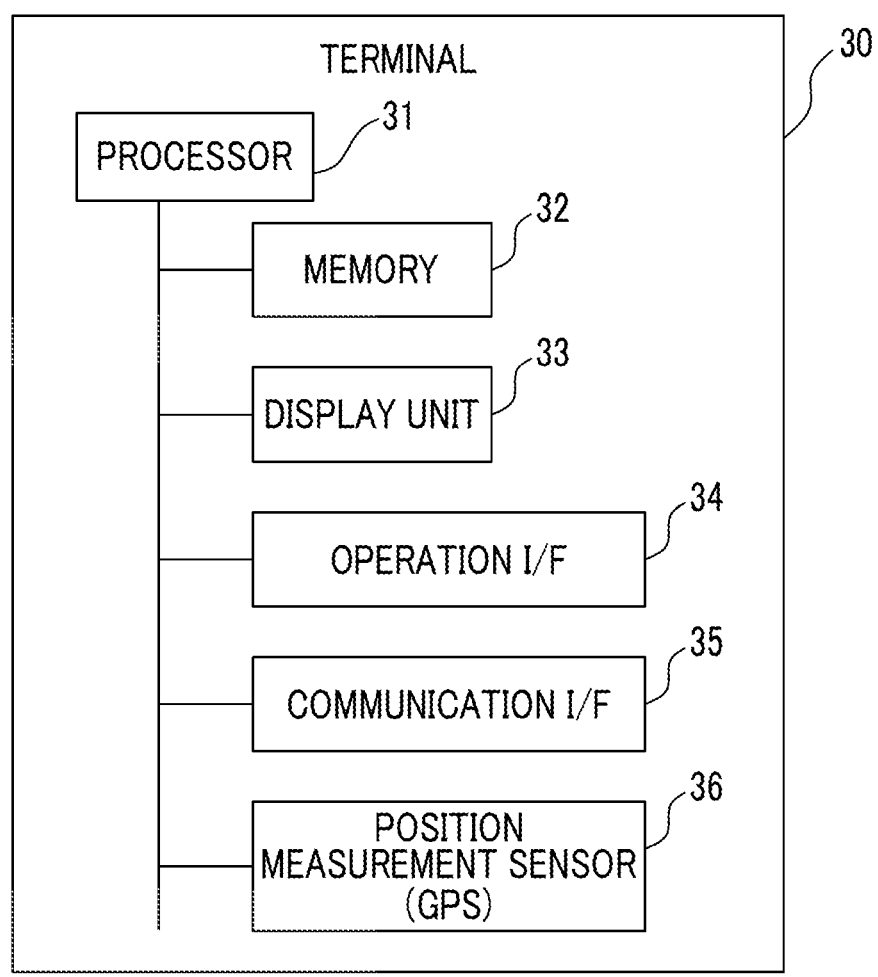
FIG. 5 is a hardware configuration diagram of a terminal.

FIG. 5 is a hardware configuration diagram of the terminal 30.

The terminal 30 includes a processor 31, a memory 32, a display unit 33, an operation interface (I/F) 34, a communication interface (I/F) 35, and a position measurement sensor 36.

The processor 31 includes one or more calculation circuits executing a computer program for control and calculation in the terminal 30 and a circuit in the vicinity of the one or more calculation circuits. The functions of the processor 31 are realized as a software module or firmware executed on the processor, for example. In addition, the functions of the processor 31 may be mounted in the terminal 30 as individual circuits.

The memory 32 includes a storage medium such as a hard disk drive (HDD), an optical storage medium, and a semiconductor storage device and stores a computer program executed in the processor 31. In addition, the memory 32 stores data that is generated by the processor 31, data that is received by the processor 31 via the network N, or the like.

The display unit 33 is controlled by the processor 31 and can display various kinds of information relating to the operation of the terminal 30. As the display unit 33, for example, a liquid crystal display can be used.

The operation I/F 34 is operated by the user 40 and an operation can be input thereto. As the operation I/F 34, for example, a keyboard, a mouse, or a touch panel integrated with the display unit 33 can be used.

The communication I/F 35 accesses a wireless base station (not shown) that is connected to the network N via a gateway (not shown) such that the communication I/F 35 is connected to the network N via the wireless base station. The communication I/F 35 is configured to be able to communicate with the server 10 and the terminal 30 via the network N.

The position measurement sensor 36 generates position information indicating the current position of the terminal 30 and outputs the position information to the processor 31. The position information generated by the position measurement sensor 36 is used for the processor 31 to automatically control the operation of the terminal 30 and is periodically transmitted to the server 10 via the network N such that the server 10 can grasp the current position of the terminal 30. The position measurement sensor 36 is, for example, a global positioning system (GPS) receiver.

Figure 6:
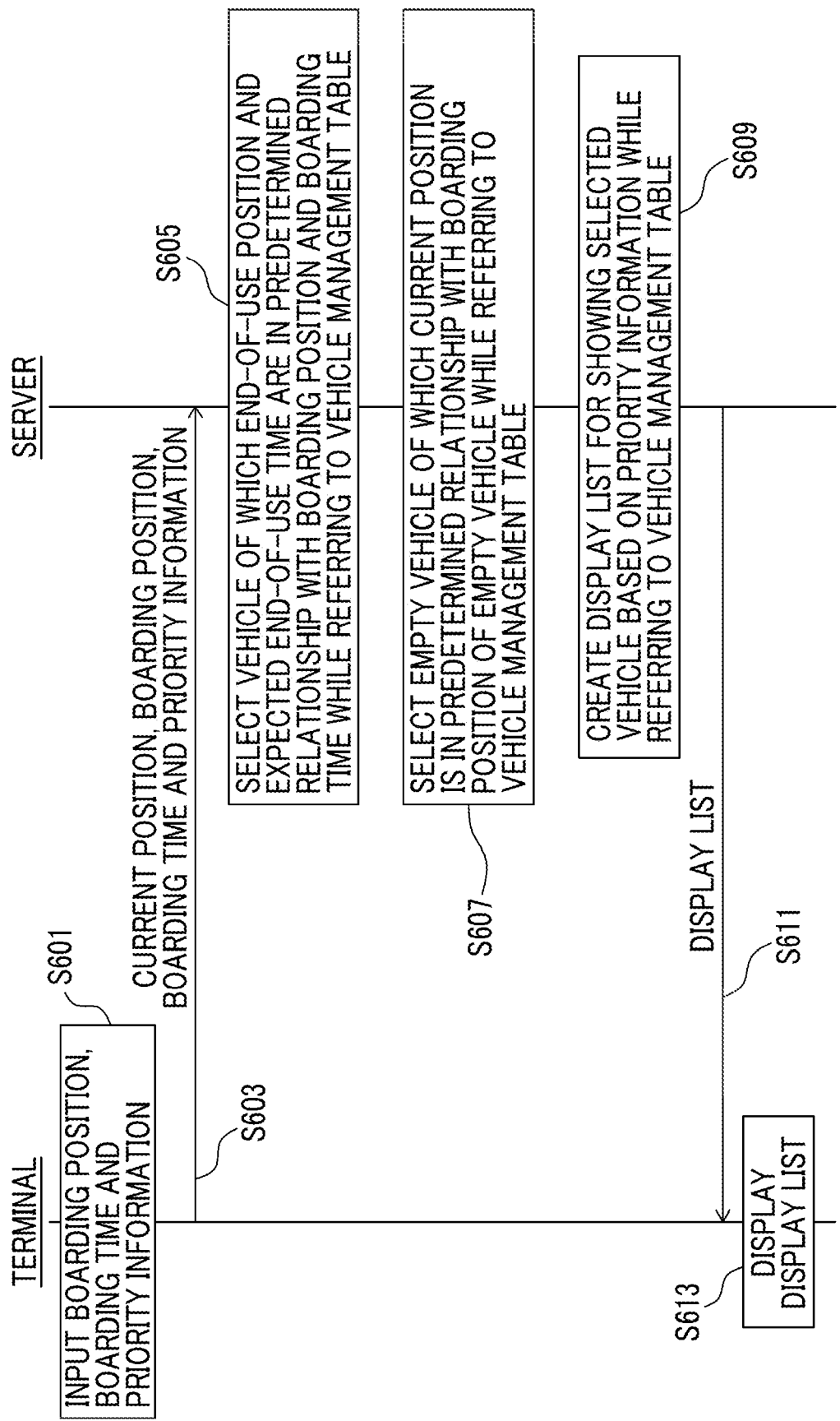
FIG. 6 is a first sequence diagram for describing the operation of the system.

Next, a first operation of the above-described system 1 will be described below with reference to a sequence diagram shown in FIG. 6.

First, in step S601, the operation I/F 34 of the terminal 30 is operated by the user 40 who requests provision of a mobility service and a boarding position and a boarding time at which the user wants to get on the vehicle 20 are input. In addition, the operation I/F 34 of the terminal 30 is operated by the user 40 and priority information with respect to a vehicle to be used is input. The priority information is vehicle-related information that takes priority when the user 40 selects the vehicle 20. Specifically, examples of the priority information include a boarding position, a boarding time, and the items registered in the vehicle management table 12c. Here, a boarding position as priority information corresponds to an end-of-use position registered in the vehicle management table 12c and a boarding time as priority information corresponds to an expected end-of-use time.

Figure 7:
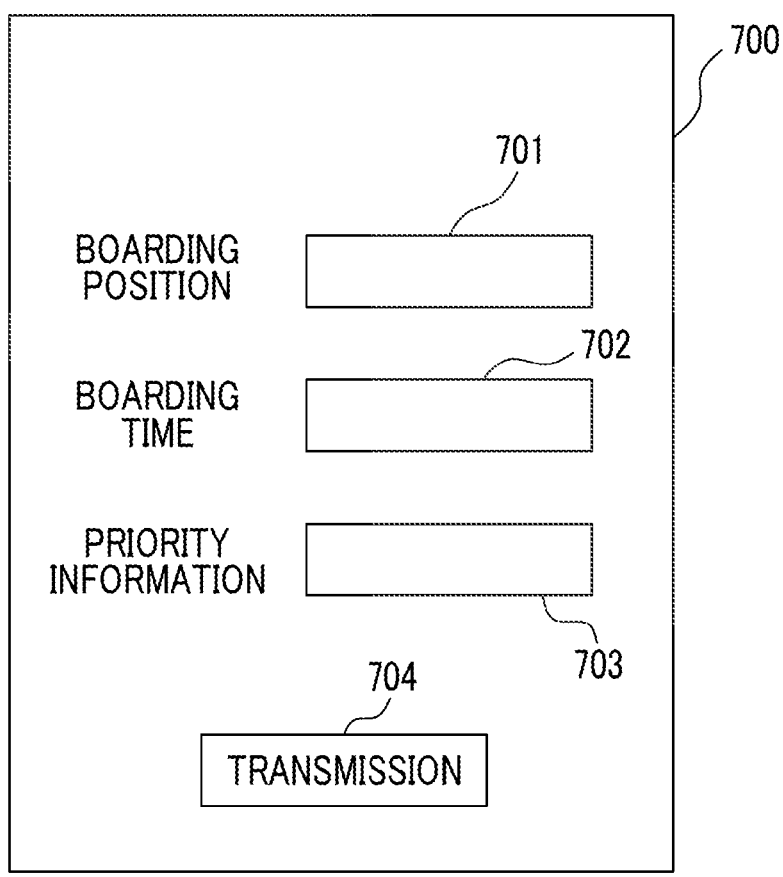
FIG. 7 is a first diagram illustrating a screen on a display unit of the terminal.

FIG. 7 is a diagram illustrating a screen on the display unit of the terminal.

A screen 700 on the display unit 33 of the terminal 30 includes an input field 701 into which a boarding position is input, an input field 702 into which a boarding time is input, and an input field 703 into which priority information is input.

After the user 40 operates the operation I/F 34 to input the boarding position into the input field 701, to input the boarding time into the input field 702, and to input the priority information into the input field 703, the user 40 operates a transmission button 704. It may be possible to select information to be input into the input field 703 by, for example, a pull-down operation.

Next, in step S603, the processor 31 of the terminal 30 transmits the current position received from the position measurement sensor 36, the boarding position, the boarding time, and the priority information to the server 10 via the communication I/F 35 and the network N.

Next, in step S605, the vehicle selection unit 11a of the processor 11 of the server 10 selects an available vehicle from vehicles occupied by users while referring to the vehicle management table 12c stored in the memory 12. Specifically, the vehicle selection unit 11a selects a vehicle identification number of one or a plurality of vehicles, of which the end-of-use position is in a first predetermined relationship with the boarding position and the expected end-of-use time is in a second predetermined relationship with the boarding time, while referring to the vehicle management table 12c. Examples of the first predetermined relationship include a relationship that a distance between the boarding position and the end-of-use position is shorter than a predetermined distance. Examples of the predetermined distance include 100 m, 300 m, 500 m, and 1000 m. When it is not possible to select a vehicle of which the end-of-use position is separated from the boarding position by a distance shorter than 100 m, the vehicle selection unit 11a may increase the distance and select a vehicle of which the end-of-use position is separated from the boarding position by a distance shorter than 300 m. Here, the vehicle selection unit 11a obtains the distance between the boarding position and the end-of-use position by referring to the map data 12b stored in the memory 12. Examples of the second predetermined relationship include a relationship that a difference between the boarding time and the expected end-of-use time is shorter than a predetermined time. Examples of the predetermined time include 5 minutes, 10 minutes, 15 minutes, and 20 minutes. Here, the boarding time may be a time earlier than the expected end-of-use time and the expected end-of-use time may be a time earlier than the boarding time. When it is not possible to select a vehicle of which the expected end-of-use time is different from the boarding time by a time shorter than 5 minutes, the vehicle selection unit 11a may increase the time and select a vehicle of which the expected end-of-use time is different from the boarding time by a time shorter than 10 minutes.

Next, in step S607, the vehicle selection unit 11a selects an available vehicle from empty vehicles not occupied by users while referring to the vehicle management table 12c.

Specifically, the vehicle selection unit 11a selects the vehicle identification number of one or a plurality of vehicles of which the current position is in a predetermined relationship with the boarding position of an empty vehicle while referring to the vehicle management table 12c. Examples of the predetermined relationship include a relationship that a distance between the boarding position and the current position is shorter than a predetermined distance. Examples of the predetermined distance include 100 m, 300 m, 500 m, and 1000 m. When it is not possible to select a vehicle of which the current position is separated from the boarding position by a distance shorter than 100 m, the vehicle selection unit 11a may increase the distance and select a vehicle of which the current position is separated from the boarding position by a distance shorter than 300 m.

Next, in step S609, the vehicle selection unit 11a creates a display list for showing the selected vehicle to the user based on the vehicle identification number of the selected vehicle and the priority information while referring to the vehicle management table 12c. The display list includes the end-of-use position and the expected end-of-use time of the selected vehicle or the current position of the selected vehicle and the vehicle-related information of the selected vehicle. For example, in a case where the priority information is the boarding position, the vehicle selection unit 11a creates the display list such that vehicles are arranged in order of increasing distance between the boarding position and the end-of-use position. In addition, for example, in a case where the priority information is whether a user can get on the vehicle 20 in a state of being on a wheelchair or not, the vehicle selection unit 11a creates the display list such that a vehicle which a user can get on in a state of being on a wheelchair is positioned on the top of the list. In addition, for example, in a case where the priority information is the load capacity, the vehicle selection unit 11a creates the display list such that vehicles are arranged in order of decreasing load capacity. The display list includes the priority of the selected vehicle.

Note that, in a case where it is not possible to select a vehicle available for the user 40, the vehicle selection unit 11a transmits a notification request for notification that it is not possible to select an available vehicle to the terminal 30. The terminal 30 causes the display unit 33 to display that it is not possible to select an available vehicle. The user 40 can return to step S601 to change the boarding position and the boarding time and select another available vehicle.

Next, in step S611, the vehicle information notification unit 11b transmits the display list to the terminal 30 via the communication I/F 15 and the network N.

Next, in step S613, the processor 31 of the terminal 30 causes the display unit 33 to display the display list.

Figure 8:
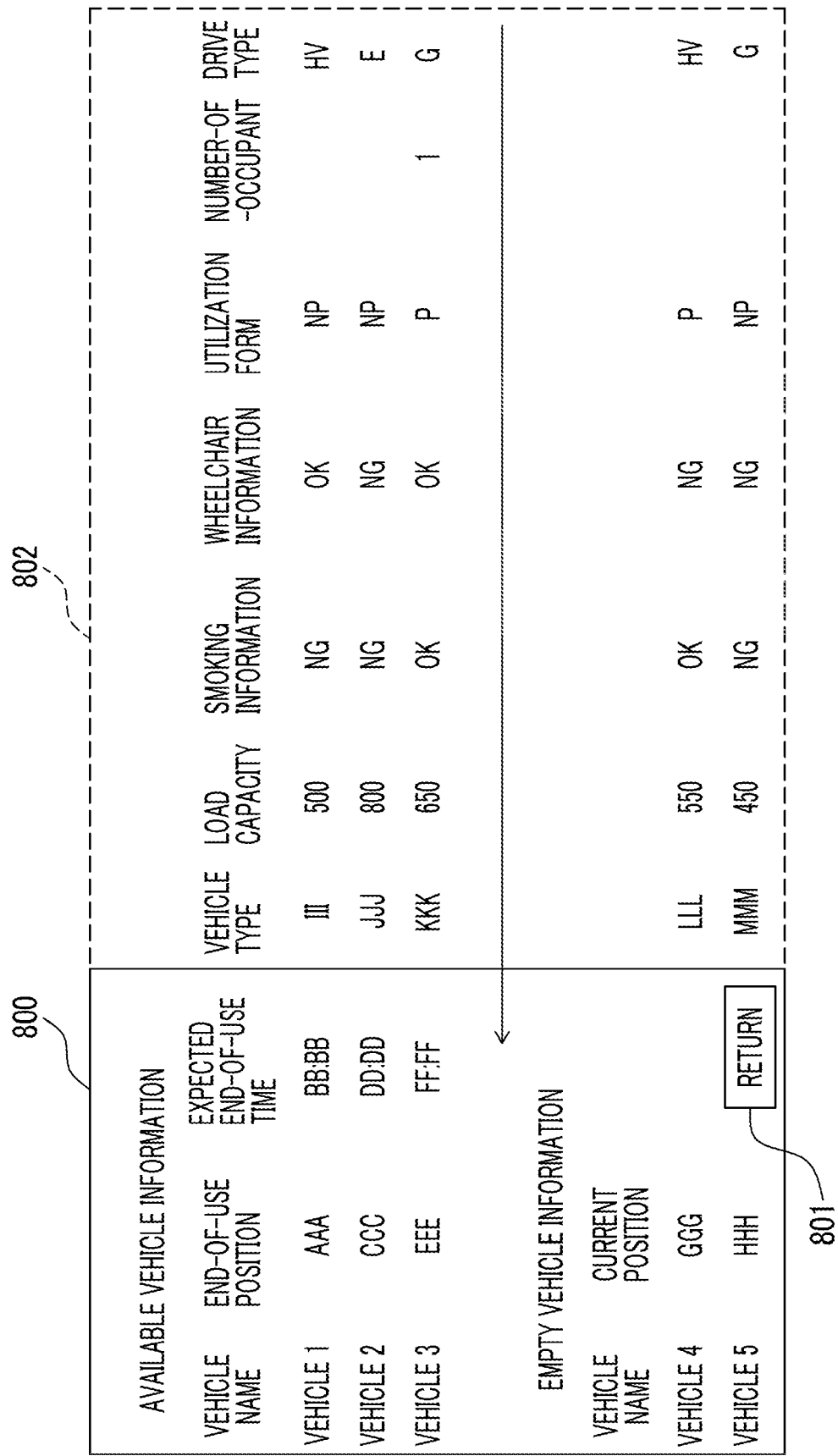
FIG. 8 is a second diagram illustrating the screen on the display unit of the terminal.
Figure 9:
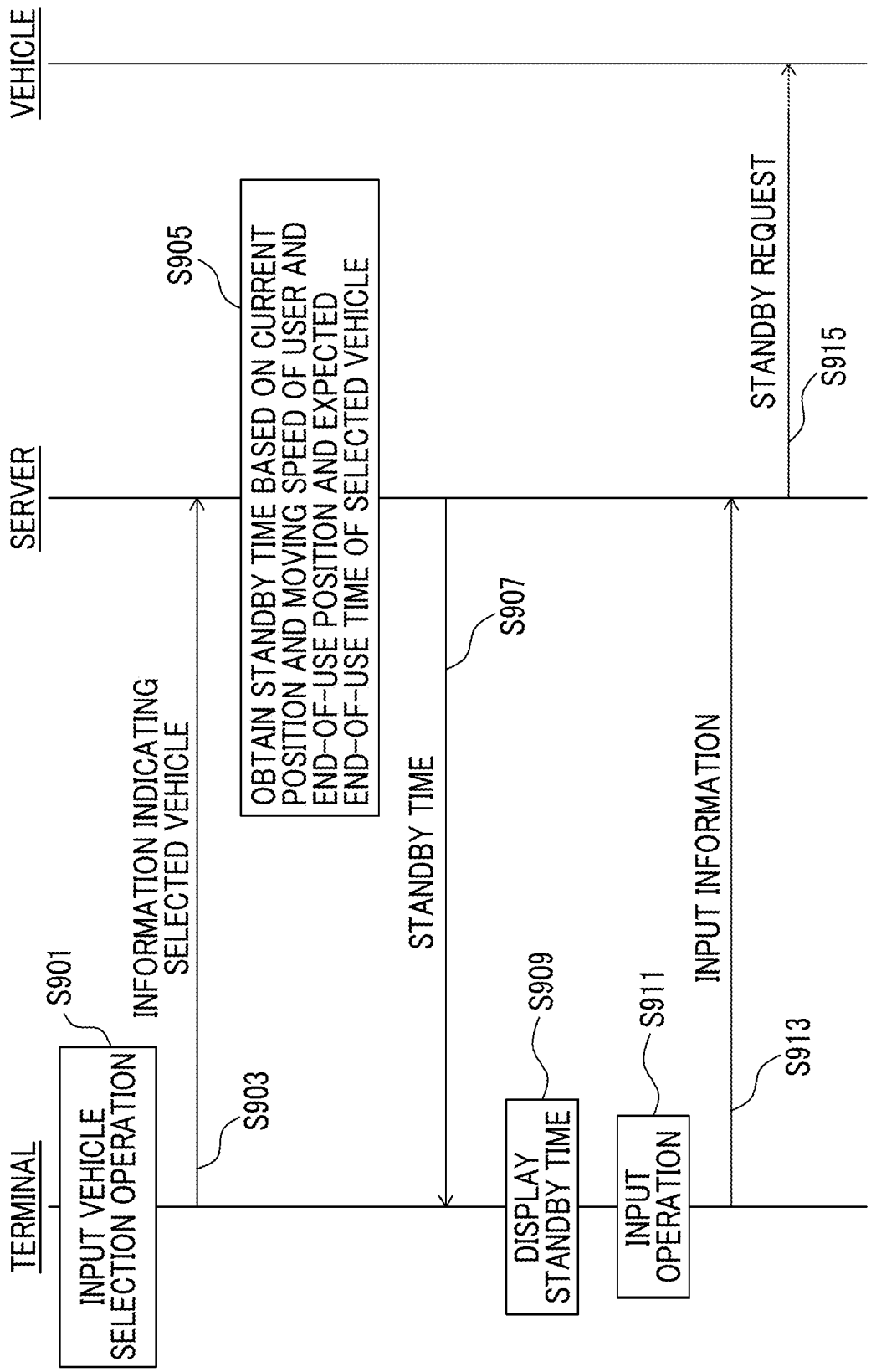
FIG. 9 is a second sequence diagram for describing the operation of the system.

FIG. 8 is a diagram illustrating a screen on the display unit of the terminal.

On a screen 800 on the display unit 33 of the terminal 30, the vehicle names, the end-of-use positions and the expected end-of-use times of vehicles that will become available out of vehicles currently used by other users are displayed as available vehicle information. The vehicle names are created to be correlated with vehicle identification numbers. In addition, on the screen 800, the vehicle names and the current positions of available vehicles out of vehicles currently not occupied by users are displayed as empty vehicle information.

In addition, the terminal 30 includes a virtual screen 802 on which a part of a display list that is not displayed on the screen 800 on the display unit 33 is displayed. The virtual screen 802 includes vehicle-related information including a vehicle type, a load capacity, smoking information (OK, NG), wheelchair information (OK, NG), a utilization form (NP: charter type, P: sharing type), the number of occupants, and a drive type (HV: hybrid, E: electric motor, G: gasoline engine), for each available vehicle. The user 40 can cause the display unit 33 to display information on the virtual screen 802 by operating (for example, swiping) the operation I/F 34.

Next, in step S901, a vehicle selection operation performed by the user 40 is input to the processor 31 of the terminal 30 by the operation I/F 34. Specifically, the user 40 performs an operation on a vehicle name displayed on the display unit 33 (for example, operation of pressing vehicle name for long time) to select a vehicle. Note that, in a case where the boarding position or the boarding time is input again and a vehicle is reselected, the user 40 operates a return button 801. In this case, the process returns to step S601.

Next, in step S903, the processor 31 of the terminal 30 transmits information indicating the selected vehicle (user-selected vehicle) to the server 10 via the communication I/F 35 and the network N.

Next, in step S905, the vehicle selection unit 11a obtains an estimated arrival time at which the user 40 arrives at an end-of-use position based on the current position of the user 40, the moving speed of the user 40 and the end-of-use position. Then, the vehicle selection unit 11a obtains a standby time for which the user 40 having arrived at the end-of-use position stands by until the vehicle 20 arrives at the end-of-use position by subtracting the estimated arrival time from an expected end-of-use time. The vehicle selection unit 11a uses the current position of the terminal 30 as the current position of the user 40. The vehicle selection unit 11a may use a fixed value such as 4 km/h as the moving speed of the user 40. Note that, the moving speed of the user 40 may be changed to another value. In a case where the value of the standby time is negative, that is, in a case where the expected end-of-use time is earlier than the estimated arrival time, the vehicle selection unit 11a sets the standby time to zero.

Next, in step S907, the vehicle information notification unit 11b transmits the standby time to the terminal 30 via the communication I/F 15 and the network N.

Next, in step S909, the processor 31 of the terminal 30 causes the display unit 33 to display the standby time.

Figure 10:
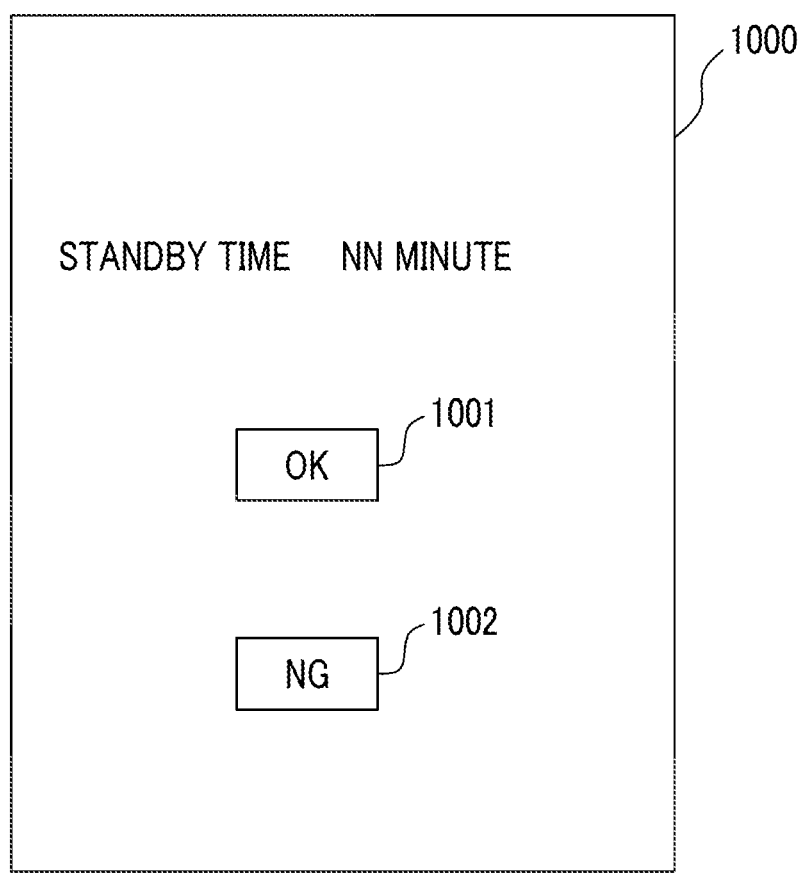
FIG. 10 is a third diagram illustrating the screen on the display unit of the terminal.
Figure 11:
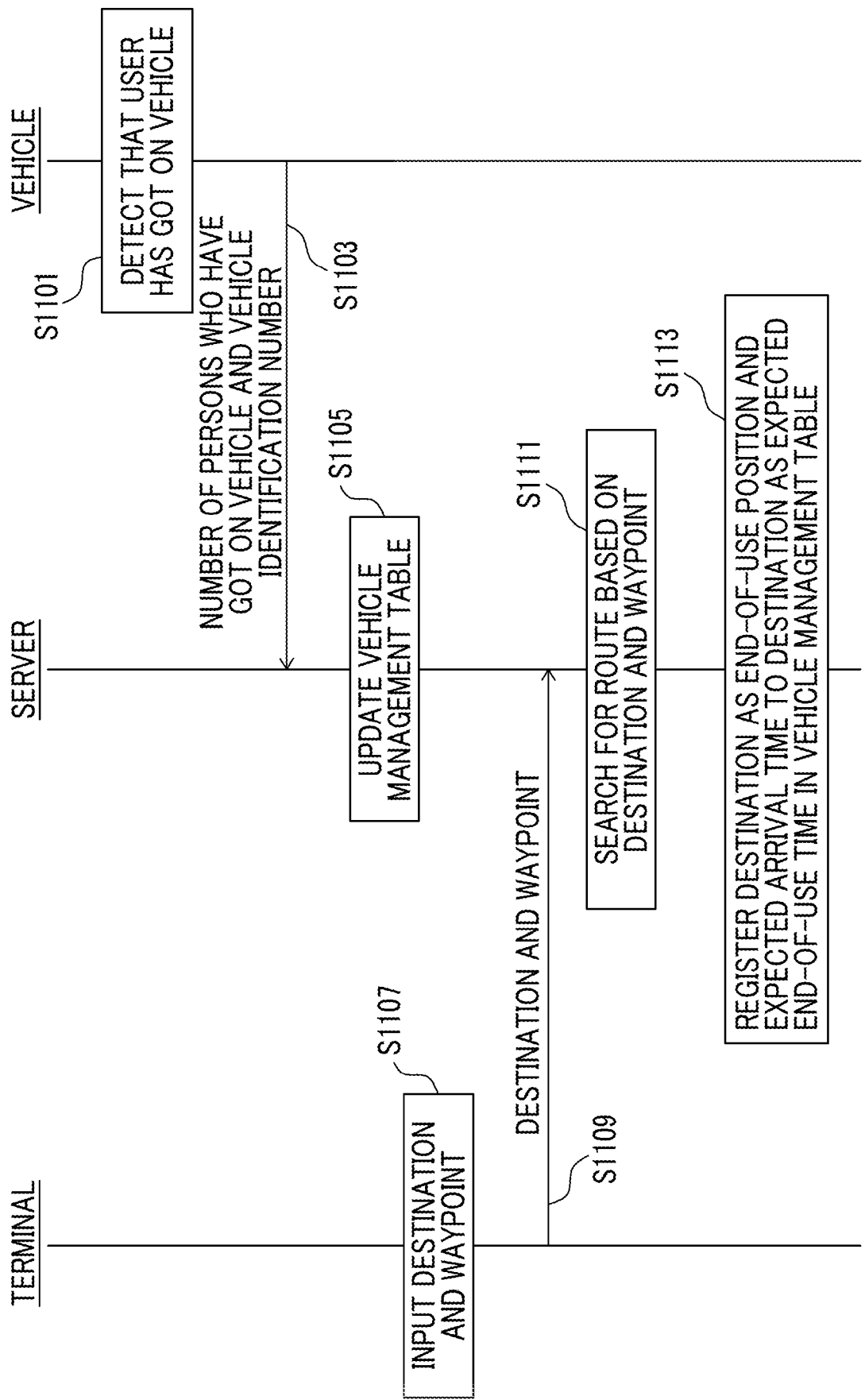
FIG. 11 is a third sequence diagram for describing the operation of the system.
Figure 12:
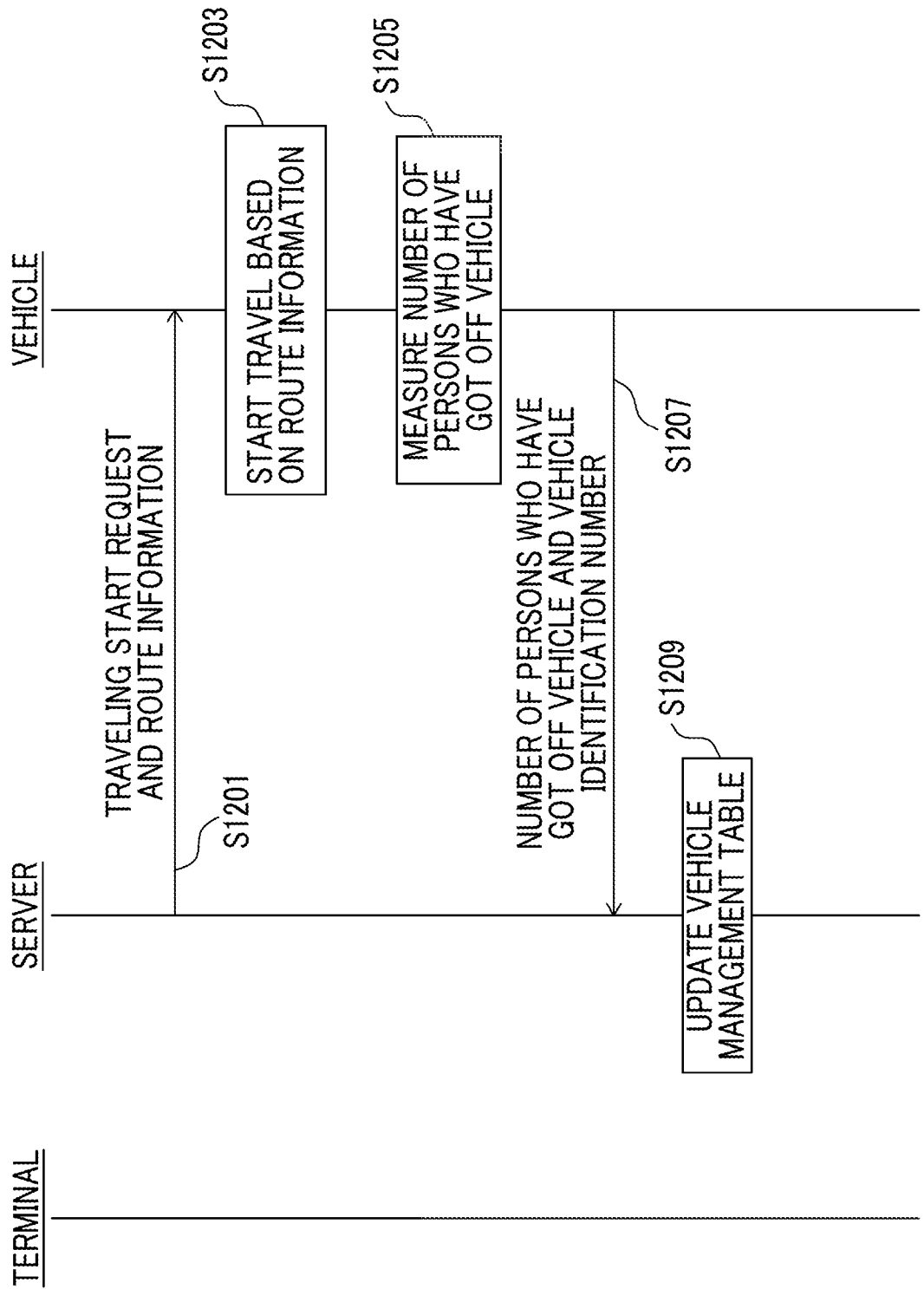
FIG. 12 is a fourth sequence diagram for describing the operation of the system.

FIG. 10 is a diagram illustrating a screen on the display unit of the terminal.

On a screen 1000 on the display unit 33 of the terminal 30, a standby time is displayed. In a case where the user 40 accepts use of a selected vehicle, the user 40 operates an OK button 1001. Meanwhile, on a case where the user 40 does not accept use of the selected vehicle, the user 40 operates an NG button 1002.

Next, in step S911, an operation performed by the user 40 is input to the processor 31 of the terminal 30 by the operation I/F 34.

Next, in step S913, the processor 31 of the terminal 30 transmits input information to the server 10 via the communication I/F 35 and the network N.

Next, in a case where the input information indicating the OK button 1001 has been operated is received, the vehicle selection unit 11a transmits a standby request that the vehicle selected by the user 40 stands by at the end-of-use position to the selected vehicle 20 via the communication I/F 15 and the network N in step S915. The standby request is a request that the vehicle 20 standby at the end-of-use position for a predetermined time from the expected endof-use time until the user 40 gets on the vehicle 20. Examples of the predetermined time include 15 minutes. Meanwhile, in a case where the NG button 1002 is operated, the process returns to step S613. In this case, the user 40 can select another vehicle with a different standby time.

The user 40 gets on the vehicle 20 at the end-of-use position.

Next, in step S1101, the autonomous driving controller 21 of the vehicle 20 detects that the user 40 has got on the vehicle 20 by receiving a sitting signal from the sitting sensor 23. The autonomous driving controller 21 measures the number of sitting signals received from the sitting sensor 23 as the number of users who have got on the vehicle.

Next, in step S1103, the autonomous driving controller 21 transmits the number of persons who have got on the vehicle and the vehicle identification number to the server 10 via the out-of-vehicle communication unit 24 and the network N.

Next, in step S1105, the vehicle information acquisition unit 11c of the processor 11 in the server 10 updates the vehicle management table 12c stored in the memory 12. Specifically, the vehicle information acquisition unit 11c registers the result of addition of the number of occupants correlated with the received vehicle identification number and the received number of persons who have got on the vehicle in the number-of-occupants field A11 while referring to the vehicle management table 12c. In addition, in a case where occupancy information correlated with the received vehicle identification number is "empty", the vehicle information acquisition unit 11c changes the occupancy information to "occupied". In addition, the vehicle information acquisition unit 11c receives vehicle information such as current position information and a traveling speed transmitted from the vehicle 20 and updates the vehicle management table 12c at predetermined time intervals or at any time.

Next, in step S1107, a destination and a waypoint are input to the processor 31 of the terminal 30 by the operation I/F 34 with the operation I/F 34 operated by the user 40 having got on the vehicle 20. The destination is a position at which the user 40 gets off the vehicle 20 and use of the vehicle 20 ends. The waypoint is a position which the user 40 wants to stop by in the middle of travel to the destination from the current position. Note that, the waypoint may not be input.

Next, in step S1109, the processor 31 of the terminal 30 transmits the destination and the waypoint to the server 10 via the communication I/F 35 and the network N.

Next, in step S1111, the route search unit 11d of the processor 11 in the server 10 searches for a route, along which the vehicle travels from the current position to the destination via the waypoint, while referring to the map data 12b stored in the memory 12. For example, the route search unit 11d may search for the route by using Dijkstra's algorithm. In addition, the route search unit 11d obtains an expected arrival time at which the vehicle arrives at the destination. The route search unit 11d may obtain the expected arrival time by acquiring traffic information. The route search unit 11d can acquire traffic information provided by a public organization or a private group via the network N. In addition, the route search unit 11d may obtain the expected arrival time based on the traveling speed of the vehicle 20.

Next, in step S1113, the vehicle information acquisition unit 11c of the processor 11 in the server 10 receives the destination, the waypoint, and the expected arrival time from the route search unit 11d. The vehicle information acquisition unit 11c registers, in the vehicle management table 12c, the destination as an end-of-use position and the expected arrival time as an expected end-of-use time with the destination and the expected arrival time correlated with the vehicle identification number. In addition, the vehicle information acquisition unit 11c may register information about the waypoint in the vehicle management table 12c with the information correlated with the vehicle identification number.

Next, in step S1201, the route search unit 11d transmits a traveling start request and route information searched for to the vehicle 20 via the communication I/F 15 and the network N. Note that, the process in step S1201 may be performed before step S1113.

Next, in step S1203, the autonomous driving controller 21 of the vehicle 20 starts travel based on the received route information.

Next, in step S1205, the user 40 gets off the vehicle 20 when the vehicle 20 arrives at the destination. The autonomous driving controller 21 of the vehicle 20 measures a difference between the number of sitting signals received from the sitting sensor 23 before arrival at the destination and the number of sitting signals received from the sitting sensor 23 after the arrival at the destination, as the number of persons who have got off the vehicle.

Next, in step S1207, the autonomous driving controller 21 transmits the number of persons who have got off the vehicle and the vehicle identification number to the server 10 via the out-of-vehicle communication unit 24 and the network N.

Next, in step S1209, the vehicle information acquisition unit 11c of the processor 11 in the server 10 updates the vehicle management table 12c stored in the memory 12. Specifically, the vehicle information acquisition unit 11c registers the result of subtraction of the received number of persons who have got off the vehicle from the number of occupants correlated with the received vehicle identification number in the number-of-occupants field A11 while referring to the vehicle management table 12c. In addition, in a case where the number of occupants is zero, the vehicle information acquisition unit 11c changes the occupancy information correlated with the received vehicle identification number to "empty".

Hereinabove, the first operation of the system 1 has been described.

Figure 13:
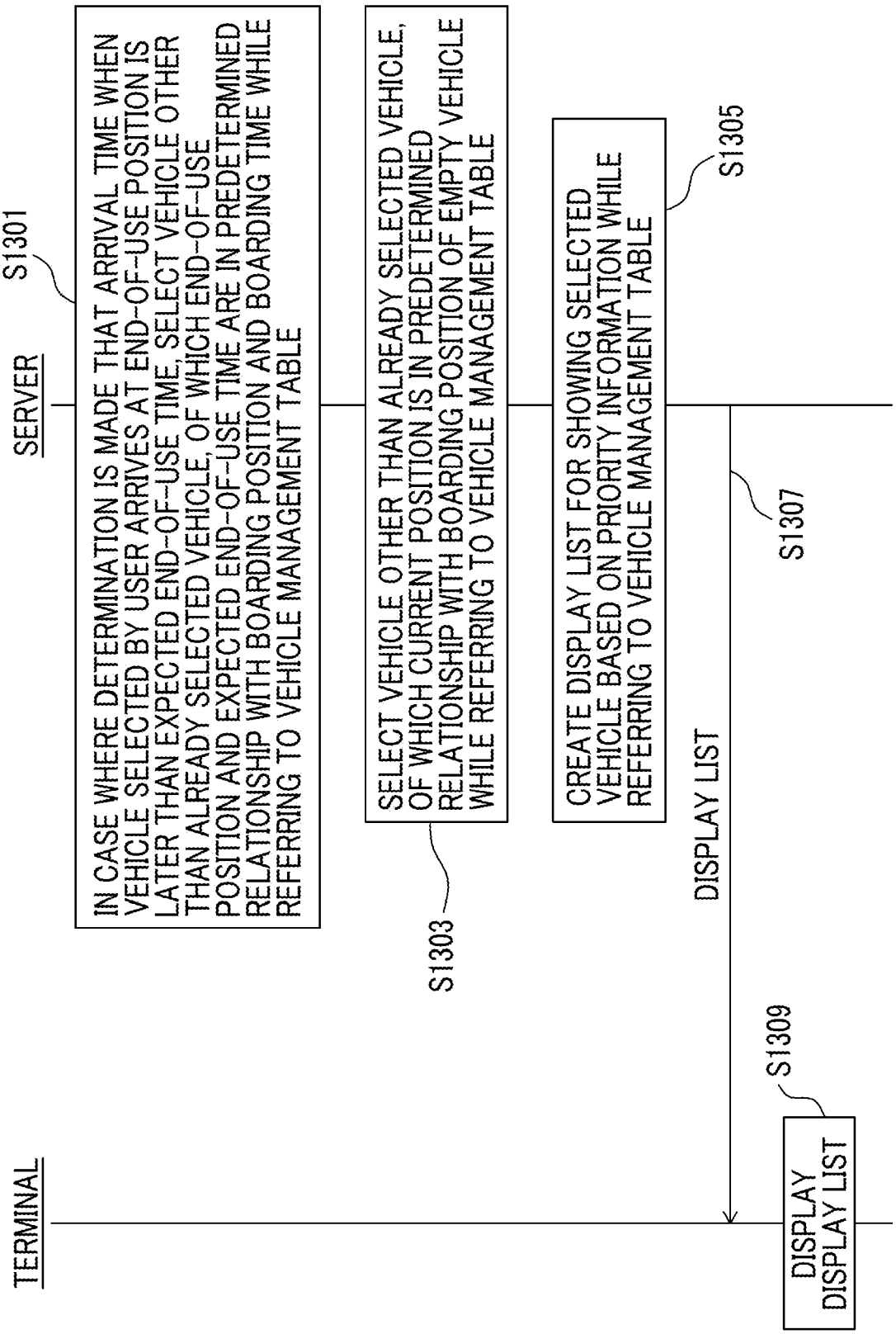
FIG. 13 is a fifth sequence diagram for describing the operation of the system.

Next, a second operation of the system 1 which is performed in a case where an expected arrival time at which the vehicle 20 arrives at an end-of-use position is later than an expected end-of-use time that the user 40 is notified of will be described below with reference to FIG. 13.

First, in step S1301, the vehicle selection unit 11a of the processor 11 in the server 10 determines whether a time at which the vehicle 20 selected by the user 40 arrives at the end-of-use position is later than the expected end-of-use time or not. The vehicle selection unit 11a acquires the current position of the vehicle 20 selected by the user 40 while referring to the vehicle management table 12c stored in the memory 12. The current position of the vehicle 20 that is registered in the vehicle management table 12c is updated at predetermined time intervals by the vehicle information acquisition unit 11c. The vehicle selection unit 11a obtains a route for the vehicle 20 and an estimated arrival time at which the vehicle 20 arrives at the end-of-use position based on the current position and the end-of-use position of the vehicle 20 selected by the user 40 at predetermined time intervals or different time intervals while referring to the map data 12b stored in the memory 12.

In a case where the vehicle selection unit 11a determines that the estimated arrival time is later than the expected end-of-use time, the vehicle selection unit 11a selects an available vehicle other than the vehicle 20 already selected from among vehicles occupied by users while referring to the vehicle management table 12c stored in the memory 12. Specifically, the vehicle selection unit 11a selects the vehicle identification number of one or a plurality of other vehicles, of which the end-of-use position is in the first predetermined relationship with the boarding position and the expected end-of-use time is in the second predetermined relationship with the boarding time, while referring to the vehicle management table 12c. A process of selecting the vehicle identification number of another vehicle is the same as that in step S605 described above.

Next, in step S1303, the vehicle selection unit 11a selects an available vehicle other than the vehicle 20 already selected from among empty vehicles not occupied by users while referring to the vehicle management table 12c. Specifically, the vehicle selection unit 11a selects the vehicle identification number of one or a plurality of vehicles of which the current position is in a predetermined relationship with the boarding position of an empty vehicle while referring to the vehicle management table 12c. A process of selecting the vehicle identification number of another vehicle is the same as that in step S607 described above.

Next, in step S1305, the vehicle selection unit 11a creates a display list for showing the selected vehicle to the user based on the vehicle identification number of the selected vehicle and priority information while referring to the vehicle management table 12c. Here, the vehicle selection unit 11a uses information that is received from the terminal 30 in step S603 as the priority information. A process of creating the display list is the same as that in step S609 described above.

Next, in step S1307, the vehicle information notification unit 11b transmits a notification request for notification that the vehicle will arrive late and the display list to the terminal 30 via the communication I/F 15 and the network N.

Next, in step S1309, the processor 31 of the terminal 30 causes the display unit 33 to display the display list with the display unit 33 displaying that the vehicle will arrive late.

In a case where the user 40 selects another vehicle, the user 40 performs an operation on a vehicle name displayed on the display unit 33 (for example, operation of pressing vehicle name for long time) to select a vehicle. In this case, a new vehicle is selected for the user 40. The operation of the system 1 performed thereafter is the same as the processes in step S903 and the subsequent steps.

Meanwhile, in a case where the user 40 does not select another vehicle, the user 40 operates the return button. In this case, the vehicle selection unit 11a of the processor 11 in the server 10 stops the second operation of step S1301 and the subsequent steps thereafter.

Note that, in a case where the user 40 selects another vehicle, the system 1 may move the newly selected vehicle to the current position (end-of-use position of previously selected vehicle) of the user 40 from the end-of-use position of the vehicle.

Hereinabove, the second operation of the system 1 has been described.

Figure 14:
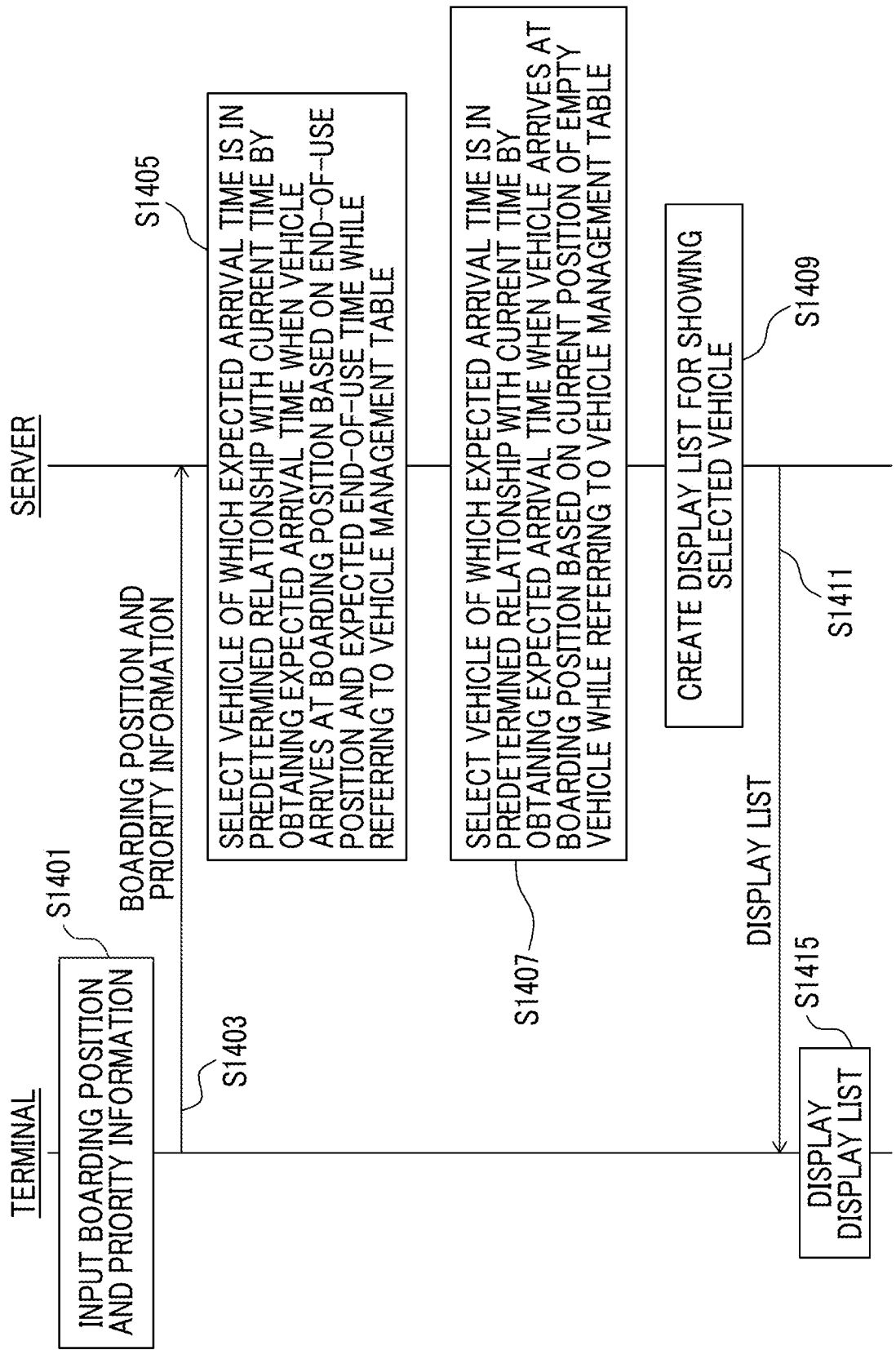
FIG. 14 is a sixth sequence diagram for describing the operation of the system.

Next, a third operation of the system 1 will be described below with reference to FIG. 14.

The third operation of the system 1 is different in the way in which the vehicle selection unit 11a of the processor 11 in the server 10 selects an available vehicle.

First, in step S1401, the operation I/F 34 of the terminal 30 is operated by the user 40 who requests provision of a mobility service and a boarding position at which the user wants to get on the vehicle 20 and priority information are input.

Next, in step S1403, the processor 31 of the terminal 30 transmits the boarding position and the priority information to the server 10 via the communication I/F 35 and the network N.

Next, in step S1405, the vehicle selection unit 11a of the processor 11 in the server 10 selects an available vehicle from vehicles occupied by users while referring to the vehicle management table 12c stored in the memory 12. Specifically, the vehicle selection unit 11a obtains an expected arrival time at which a vehicle departing from an end-of-use position at an expected end-of-use time arrives at the boarding position for each of vehicles occupied by users while referring to the vehicle management table 12c and the map data 12b. Then, the vehicle selection unit 11a obtains the vehicle identification number of a vehicle of which the expected arrival time is in a predetermined relationship with the current time. Examples of the predetermined relationship include a relationship that a difference between the expected arrival time and the current time is shorter than a predetermined time. Examples of the predetermined time include 5 minutes, 10 minutes, 15 minutes, and 20 minutes. When it is not possible to select a vehicle of which the expected arrival time is different from the current time by a time shorter than 5 minutes, the vehicle selection unit 11a may increase the time and select a vehicle of which the expected arrival time is different from the current time by a time shorter than 10 minutes.

Next, in step S1407, the vehicle selection unit 11a selects an available vehicle from among empty vehicles not occupied by users while referring to the vehicle management table 12c. Specifically, the vehicle selection unit 11a obtains an expected arrival time at which a vehicle departing from the current position arrives at the boarding position for each of the empty vehicles while referring to the vehicle management table 12c. Then, the vehicle selection unit 11a obtains the vehicle identification number of a vehicle of which the expected arrival time is in a predetermined relationship with the current time. Examples of the predetermined relationship include a relationship that a difference between the expected arrival time and the current time is shorter than a predetermined time. Examples of the predetermined time include 5 minutes, 10 minutes, 15 minutes, and 20 minutes. When it is not possible to select a vehicle of which the expected arrival time is different from the current time by a time shorter than 5 minutes, the vehicle selection unit 11a may increase the time and select a vehicle of which the expected arrival time is different from the current time by a time shorter than 10 minutes.

Next, in step S1409, the vehicle selection unit 11a creates a display list for showing the selected vehicle to the user based on the vehicle identification number of the selected vehicle and the priority information while referring to the vehicle management table 12c. For example, in a case where the priority information is the boarding time, the vehicle selection unit 11a creates the display list such that vehicles are arranged in order of increasing difference between the expected arrival time and the boarding time. In addition, in a case where the priority information is whether a user can get on the vehicle 20 in a state of being on a wheelchair or not, the vehicle selection unit 11a creates the display list such that a vehicle which a user can get on in a state of being on a wheelchair is positioned on the top of the list. In addition, for example, in a case where the priority information is the load capacity, the vehicle selection unit 11a creates the display list such that vehicles are arranged in order of decreasing load capacity. The display list includes information about the order in which the expected arrival times of vehicles are arranged in accordance with the priority information.

Next, in step S1411, the vehicle information notification unit 11b of the processor 11 in the server 10 transmits the display list to the terminal 30 via the communication I/F 15 and the network N.

Next, in step S1415, the processor 31 of the terminal 30 causes the display unit 33 to display the display list.

Figure 15:
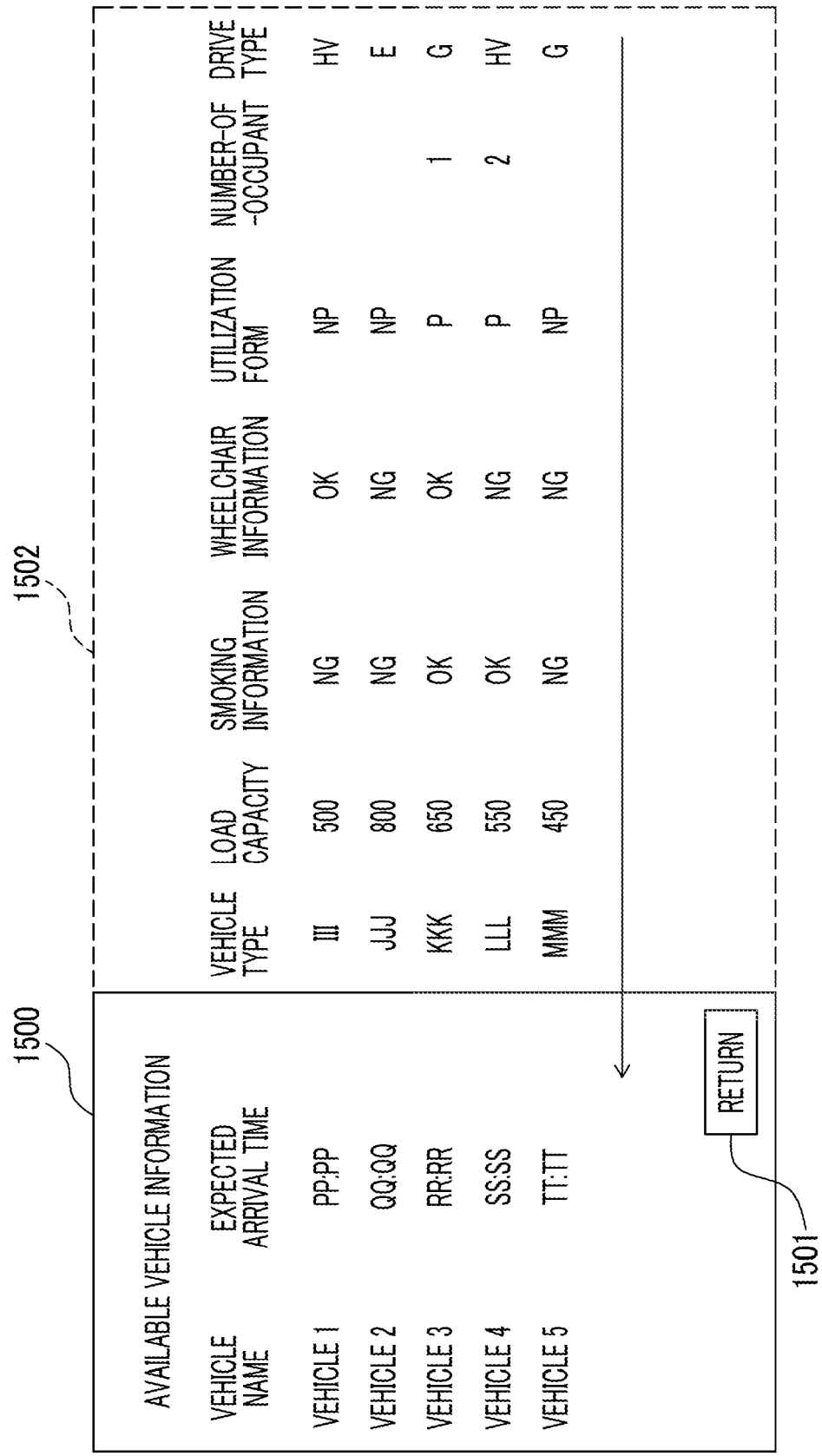
FIG. 15 is a fourth diagram illustrating the screen on the display unit of the terminal.

FIG. 15 is a diagram illustrating a screen on the display unit of the terminal.

On a screen 1500 on the display unit 33 of the terminal 30, vehicle names and expected arrival times are displayed as available vehicle information. The vehicle names are created to be correlated with vehicle identification numbers. In addition, the terminal 30 includes a virtual screen 1502 on which a part of a display list that is not displayed on the screen 1500 on the display unit 33 is displayed, and a return button 1501.

The operation of the system 1 after a process in which the user 40 selects a vehicle that the user 40 wants to use is the same as the first operation described above.

In the case of the system according to the present embodiment described above, since a user is notified of an available vehicle based on a boarding position and a boarding time at which the user wants to get on a vehicle subject to autonomous driving control, it is possible to improve a vehicle occupancy rate.

In the disclosure, a vehicle information processing apparatus, a system processing vehicle information, and a method of processing vehicle information according to the above-described embodiment can be appropriately changed without departing from the gist of the disclosure.

For example, the first predetermined relationship between the boarding position and the end-of-use position is not limited to the relationship as described above. For example, in a case where the boarding position is a north exit of a station, the end-of-use position may be the north exit of the same station.

In addition, the second predetermined relationship between the boarding time and the expected end-of-use time is not limited to the relationship as described above. For example, the expected end-of-use time may be limited to a time earlier than the boarding time.

What is claimed is:

1. A vehicle information processing system comprising:
a plurality of vehicles; and
a vehicle information processing apparatus comprising:
a processor configured to:
acquire a boarding position and a boarding time at which a first user wants to get on a vehicle,
select at least one vehicle, of which an end-of-use position and an expected end-of-use time, at which a second user of a vehicle ends use of the vehicle for each of the plurality of vehicles, are in a predetermined relationship with the boarding position and the boarding time, from among the plurality of vehicles,
transmit, to a terminal, information on the at least one vehicle selected by the processor and information on the end-of-use position and the expected end-of-use time of each of the at least one vehicle,
cause the terminal to display the information transmitted to the terminal,
receive information on a vehicle selected by the first user from among the at least one vehicle,
transmit a standby request to request the vehicle selected by the first user to standby at the end-of-use position at which the second user ends use of the vehicle until the first user gets on the vehicle selected by the first user,
when it is not possible to select a vehicle of which the end-of-use position is separated from the boarding position by a distance shorter than a first distance, select at least one vehicle of which the end-of-use position is separated from the boarding position by a distance shorter than a second distance, the second distance greater than the first distance, and
when it is not possible to select a vehicle of which the expected end-of-use time is different from the boarding time by a time shorter than a first time, select at least one vehicle of which the expected end-of-use time is different from the boarding time by a time shorter than a second time, the second time greater than the first time,
wherein when the vehicle receives the standby request, the vehicle is autonomously controlled to standby at the end-of-use position at which the second user ends use of the vehicle until the first user gets on the vehicle.

2. The vehicle information processing system according to claim 1, wherein the vehicle information processing apparatus includes a memory that stores vehicle-related information including information about a vehicle other than an end-of-use position and an expected end-of-use time of the vehicle for each of the plurality of vehicles; and
wherein the processor notifies the terminal of the end-of-use position, the expected end-of-use time, and vehicle-related information of each of the at least one selected vehicle.

3. The vehicle information processing system according to claim 2, wherein:
the processor decides a priority level of each of the at least one selected vehicle based on the end-of-use position, the expected end-of-use time, and the vehicle-related information; and
the processor notifies the terminal of the priority level along with the end-of-use position and the expected end-of-use time of each of the at least one selected vehicle.

4. The vehicle information processing system according to claim 1, wherein:
the processor acquires information indicating a current position of the first user and a user-selected vehicle selected by the first user from among the plurality of vehicles;
the processor obtains a standby time for which the first user having arrived at an end-of-use position stands by until the user-selected vehicle arrives at the end-of-use position based on the current position of the first user, a moving speed of the first user, and an end-of-use position and an expected end-of-use time of the user-selected vehicle; and
the processor notifies the terminal of the standby time.

5. The vehicle information processing system according to claim 1, wherein:
the processor acquires information indicating a current position of the first user and a user-selected vehicle selected by the first user from among the plurality of vehicles;

the processor selects at least one vehicle other than the user-selected vehicle, of which an end-of-use position and an expected end-of-use time are in the predetermined relationship with the boarding position and the boarding time, from among the plurality of vehicles in a case where a time at which the user-selected vehicle arrives at an end-of-use position is later than an expected end-of-use time; and the processor notifies the terminal of the end-of-use position and the expected end-of-use time of each of the at least one selected other vehicle.

6. The vehicle information processing apparatus according to claim 5, wherein the processor is configured to:

cause the terminal to display the information transmitted to the terminal;

receive information on an alternative vehicle selected by the user from among the at least one selected other vehicle; and cause the alternative vehicle selected by the first user to move to the end-of-use position of the vehicle previously selected by the first user.

7. The vehicle information processing system according to claim 1, wherein the processor selects the at least one vehicle, of which the end-of-use position is separated from the boarding position by a predetermined distance and the expected end-of-use time is within a predetermined time from the boarding time, from among the plurality of vehicles.

8. The vehicle information processing apparatus according to claim 1, wherein the processor is configured to:

when it is not possible to select a vehicle of which the end-of-use position is separated from the boarding position by a distance shorter than a first distance, select a vehicle of which the end-of-use position is separated from the boarding position by a distance shorter than a second distance longer than the first distance; and when it is not possible to select a vehicle of which the expected end-of-use time is different from the boarding time by a time shorter than a first time, select a vehicle of which the expected end-of-use time is different from the boarding time by a time shorter than a second time longer than the first time.

9. A vehicle information processing system comprising:

a plurality of vehicles;

a terminal to which information is input by a first user; and a vehicle information processing apparatus including:

a processor configured to:

acquire a boarding position and a boarding time at which the first user wants to get on a vehicle, select at least one vehicle, of which an end-of-use position and an expected end-of-use time, at which a second user of a vehicle ends use of the vehicle for each of the plurality of vehicles, are in a predetermined relationship with the boarding position and the boarding time, from among the plurality of vehicles, transmit, to the terminal, information on the at least one vehicle selected by the processor and information on the end-of-use position and the expected end-of-use time of each of the at least one vehicle selected by the processor, cause the terminal to display the information transmitted to the terminal, receive the information on a vehicle selected by the first user from among the at least one vehicle, transmit a standby request to request the vehicle selected by the first user to standby at the end-of-use position at which the second user ends use of the vehicle until the first user gets on the vehicle selected by the first user, when it is not possible to select a vehicle of which the end-of-use position is separated from the boarding position by a distance shorter than a first distance, select at least one vehicle of which the end-of-use position is separated from the boarding position by a distance shorter than a second distance, the second distance greater than the first distance, and when it is not possible to select a vehicle of which the end-of-use time is different from the boarding time by a time shorter than a first time, select at least one vehicle of which the expected end-of-use time is different from the boarding time by a time shorter than a second time, the second time greater than the first time, wherein when the vehicle receives the standby request, the vehicle is autonomously controlled to standby at the end-of-use position at which the second user ends use of the vehicle until the first user gets on the vehicle.

10. The vehicle information processing system according to claim 9, wherein the vehicle information processing apparatus includes a memory that stores vehicle-related information including information about a vehicle other than an end-of-use position and an expected end-of-use time of the vehicle for each of the plurality of vehicles; and wherein the processor notifies the terminal of the end-of-use position, the expected end-of-use time, and vehicle-related information of each of the at least one selected vehicle.

11. The vehicle information processing system according to claim 9, wherein:

the processor decides a priority level of each of the at least one selected vehicle based on the end-of-use position, the expected end-of-use time, and the vehicle-related information; and the processor notifies the terminal of the priority level along with the end-of-use position and the expected end-of-use time of each of the at least one selected vehicle.

12. The vehicle information processing system according to claim 9, wherein:

the processor acquires information indicating a current position of the first user and a user-selected vehicle selected by the first user from among the plurality of vehicles;

the processor obtains a standby time for which the first user having arrived at an end-of-use position stands by until the user-selected vehicle arrives at the end-of-use position based on the current position of the first user, a moving speed of the first user, and an end-of-use position and an expected end-of-use time of the user-selected vehicle; and the processor notifies the terminal of the standby time.

13. The vehicle information processing system according to claim 9, wherein:

the processor acquires information indicating a current position of the first user and a user-selected vehicle selected by the first user from among the plurality of vehicles;

the processor selects at least one vehicle other than the user-selected vehicle, of which an end-of-use position and an expected end-of-use time are in the predetermined relationship with the boarding position and the boarding time, from among the plurality of vehicles in a case where a time at which the user-selected vehicle arrives at an end-of-use position is later than an expected end-of-use time; and the processor notifies the terminal of the end-of-use position and the expected end-of-use time of each of the at least one selected other vehicle.

14. The vehicle information processing system according to claim 9, wherein the processor selects the at least one vehicle, of which the end-of-use position is separated from the boarding position by a predetermined distance and the expected end-of-use time is within a predetermined time from the boarding time, from among the plurality of vehicles.

15. A terminal which processes vehicle information, the terminal comprising:

an input unit to which information is input by a first user;
a display configured to display information received; and
a processor, wherein:
the processor receives an input of a boarding position and a boarding time, at which the first user wants to get on a vehicle subjected to autonomous driving control, from the first user using the input unit;
the processor transmits the boarding position and the boarding time to a server;
the processor receives an end-of-use position and an expected end-of-use time of at least one vehicle, of which the end-of-use position and the expected end-of-use time, at which a second user of a vehicle ends use of the vehicle for each of a plurality of vehicles, are in a predetermined relationship with the boarding position and the boarding time and that the server selects from among the plurality of vehicles occupied by the second user while referring to a memory storing the end-of-use position and the expected end-of-use time;
the processor causes the display to display the end-of-use position and the expected end-of-use time of each of the at least one vehicle; and
the processor causes the at least one vehicle to standby at the end-of-use position at which the second user ends use of the vehicle until the first user gets on the at least one vehicle.

16. The terminal of claim 15, wherein the input unit is a portion of the display.

17. The terminal according to claim 15, wherein:
a memory stores vehicle-related information including information about a vehicle other than an end-of-use position and an expected end-of-use time of the vehicle for each of the plurality of vehicles; and
the processor notifies the terminal of the end-of-use position, the expected end-of-use time, and vehicle-related information of each of the at least one selected vehicle.

18. The terminal according to claim 15, wherein:
the processor decides a priority level of each of the at least one selected vehicle based on the end-of-use position, the expected end-of-use time, and the vehicle-related information; and
the processor notifies the terminal of the priority level along with the end-of-use position and the expected end-of-use time of each of the at least one selected vehicle.

19. The terminal according to claim 15, wherein:
the processor acquires information indicating a current position of the first user and a user-selected vehicle selected by the first user from among the plurality of vehicles;
the processor obtains a standby time for which the first user having arrived at an end-of-use position stands by until the user-selected vehicle arrives at the end-of-use position based on the current position of the first user, a moving speed of the first user, and an end-of-use position and an expected end-of-use time of the user-selected vehicle; and
the processor notifies the terminal of the standby time.

20. The terminal according to claim 15, wherein:
the processor acquires information indicating a current position of the first user and a user-selected vehicle selected by the first user from among the plurality of vehicles;
the processor selects at least one vehicle other than the user-selected vehicle, of which an end-of-use position and an expected end-of-use time are in the predetermined relationship with the boarding position and the boarding time, from among the plurality of vehicles in a case where a time at which the user-selected vehicle arrives at an end-of-use position is later than an expected end-of-use time; and
the processor notifies the terminal of the end-of-use position and the expected end-of-use time of each of the at least one selected other vehicle.

* * * * *